Dec. 6, 1949 W. FERRIS 2,490,515
POWER TRANSMISSION AND SUPPORT THEREFOR
Filed Feb. 5, 1945 8 Sheets—Sheet 4
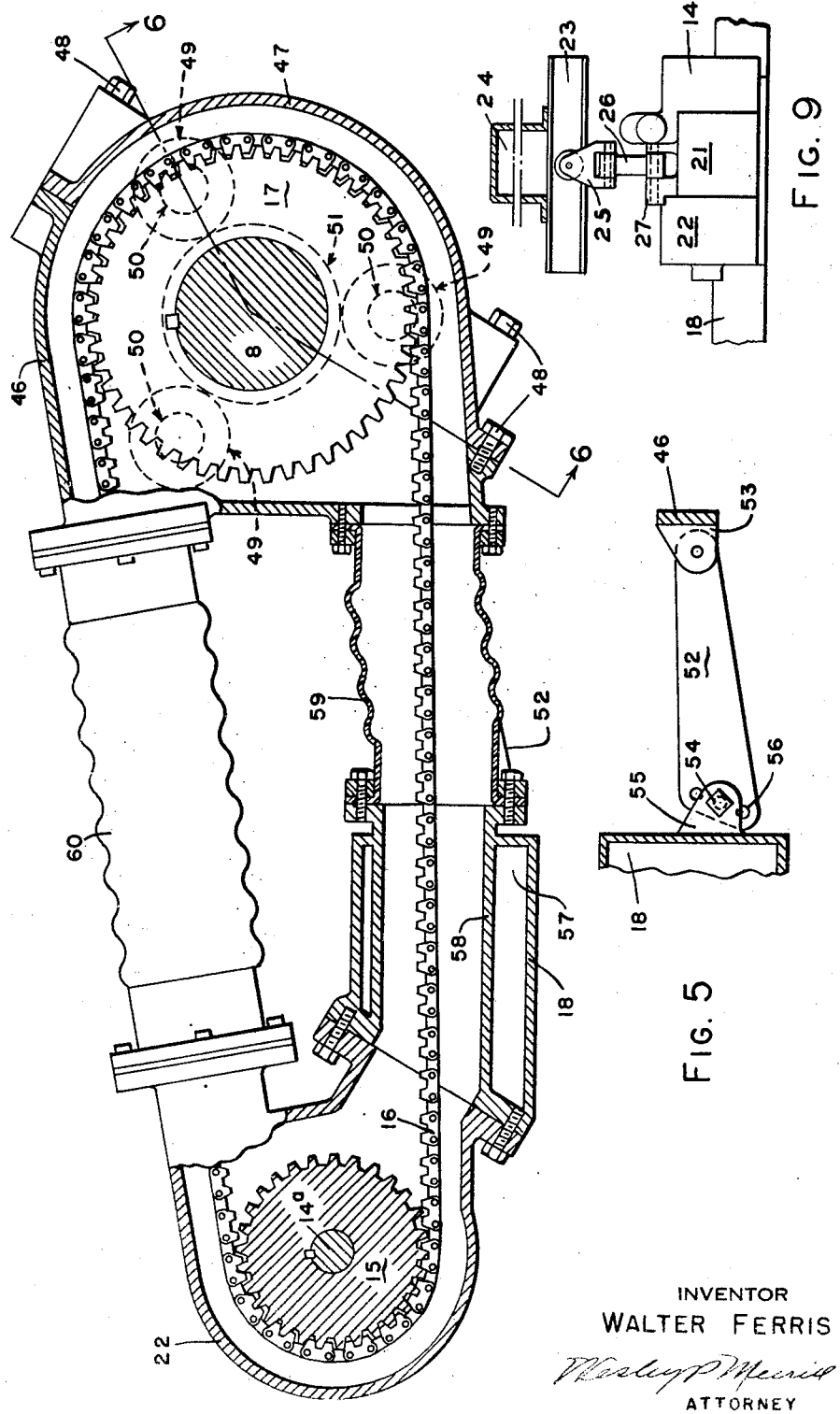
INVENTOR
WALTER FERRIS
ATTORNEY Dec. 6, 1949 — W. FERRIS — 2,490,515
POWER TRANSMISSION AND SUPPORT THEREFOR
Filed Feb. 5, 1945 — 8 Sheets-Sheet 5
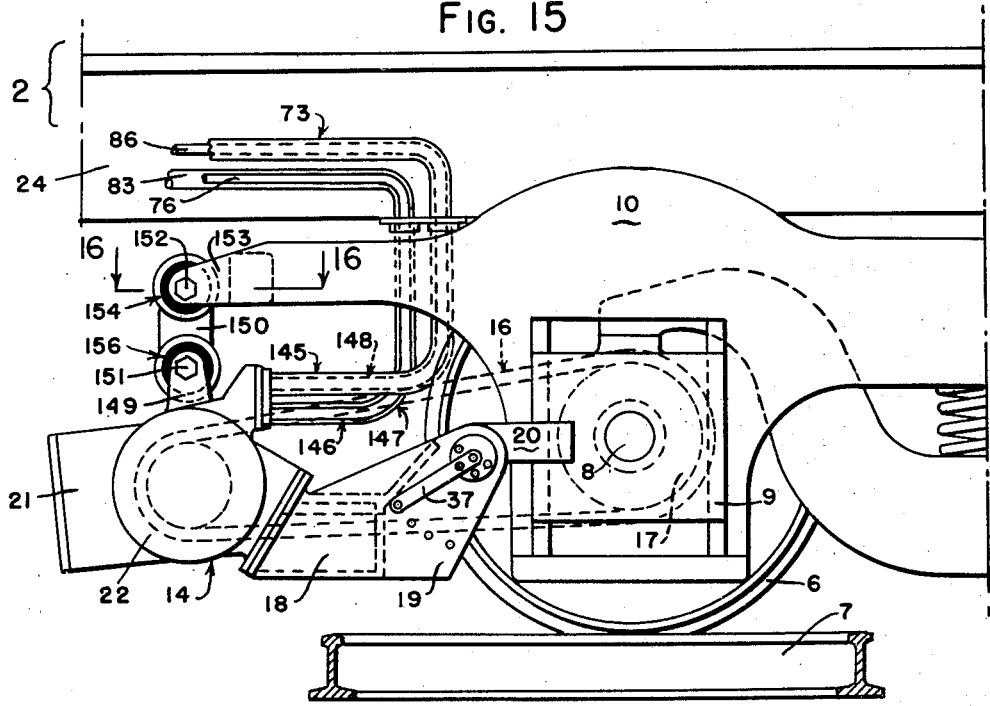
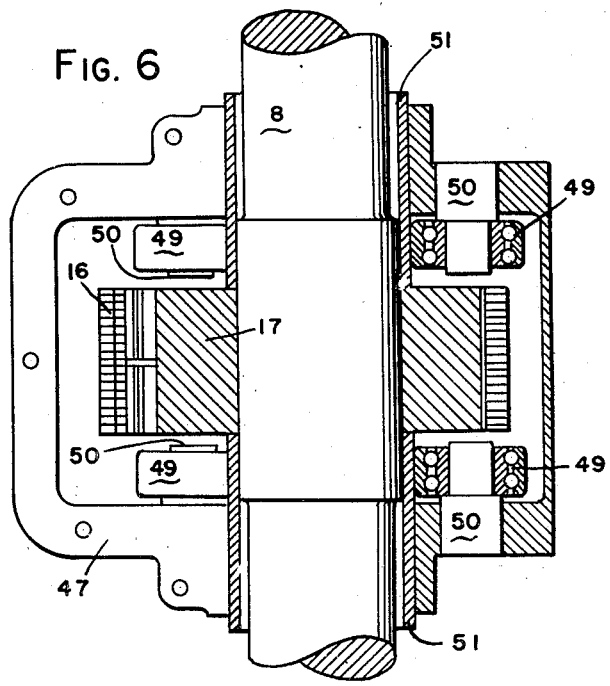
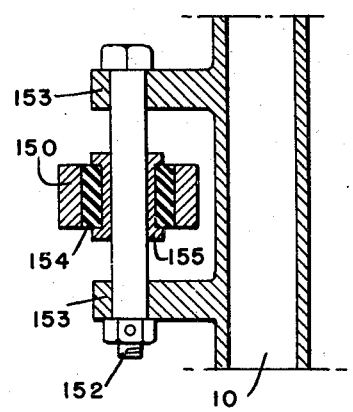
INVENTOR
WALTER FERRIS
ATTORNEY Dec. 6, 1949 W. FERRIS 2,490,515
POWER TRANSMISSION AND SUPPORT THEREFOR
Filed Feb. 5, 1945 8 Sheets-Sheet 6
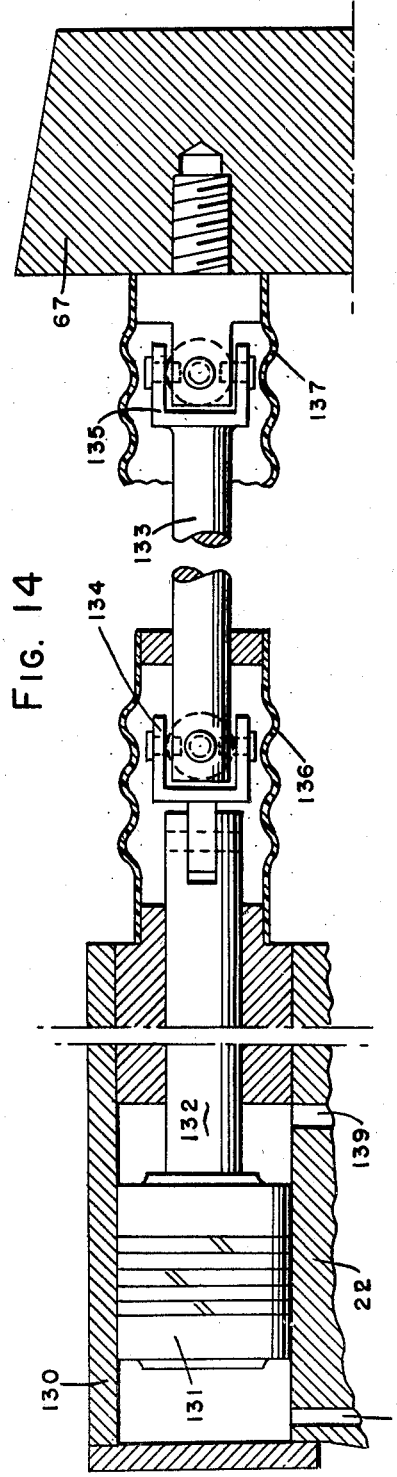
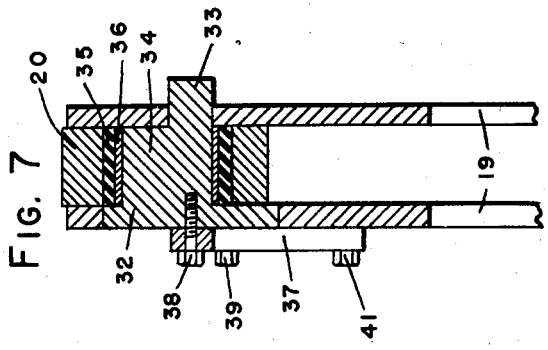
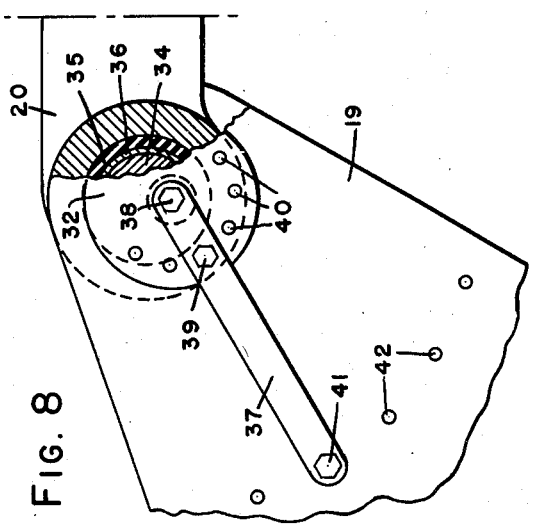
INVENTOR
WALTER FERRIS
BY
ATTORNEY Dec. 6, 1949 W. FERRIS 2,490,515
POWER TRANSMISSION AND SUPPORT THEREFOR
Filed Feb. 5, 1945 8 Sheets-Sheet 7
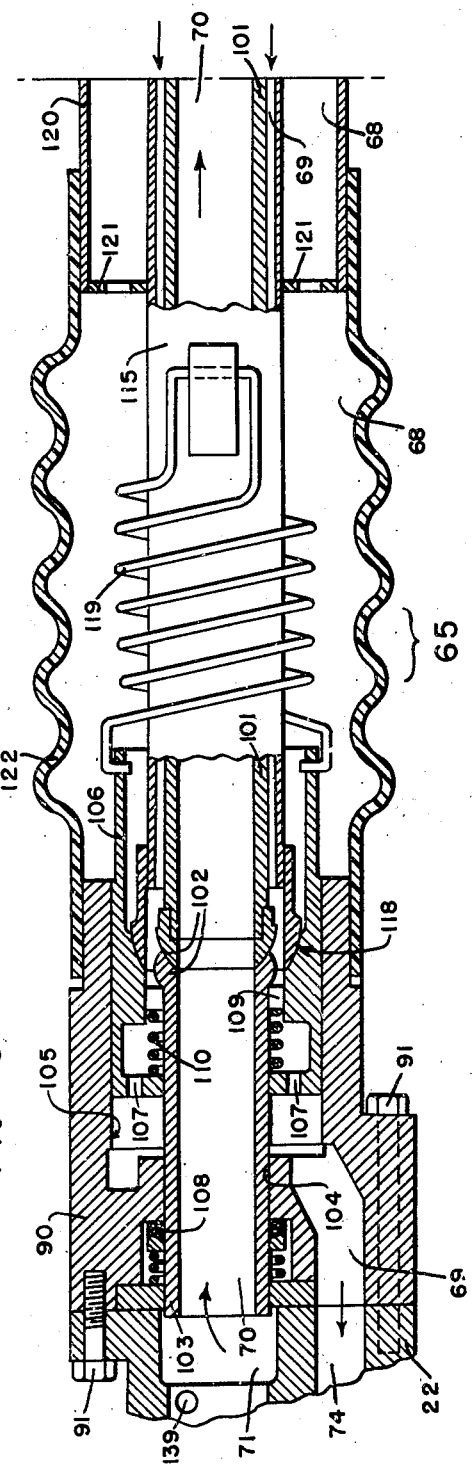
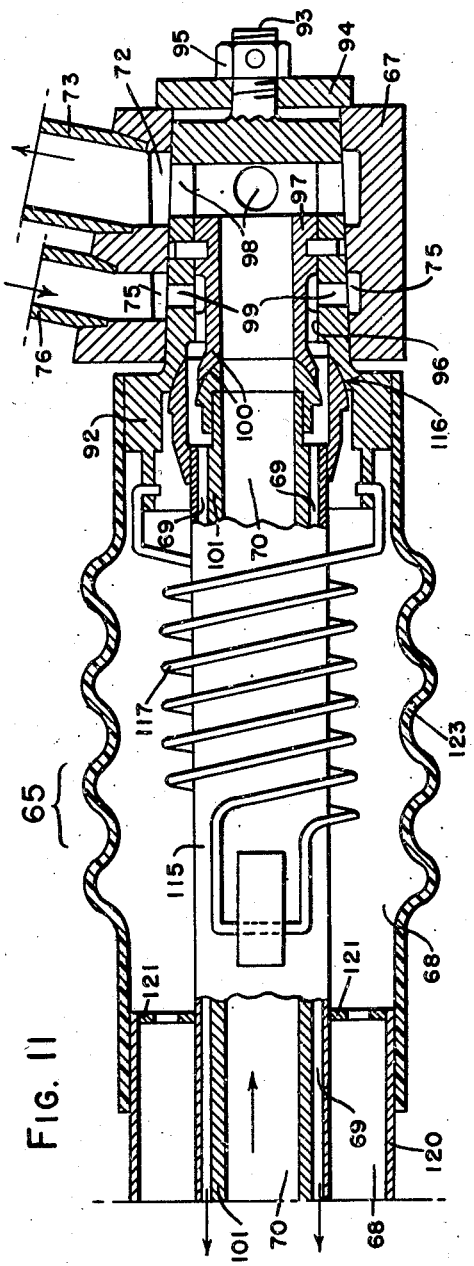
INVENTOR
WALTER FERRIS
ATTORNEY Dec. 6, 1949 W. FERRIS 2,490,515
POWER TRANSMISSION AND SUPPORT THEREFOR
Filed Feb. 5, 1945 8 Sheets-Sheet 8

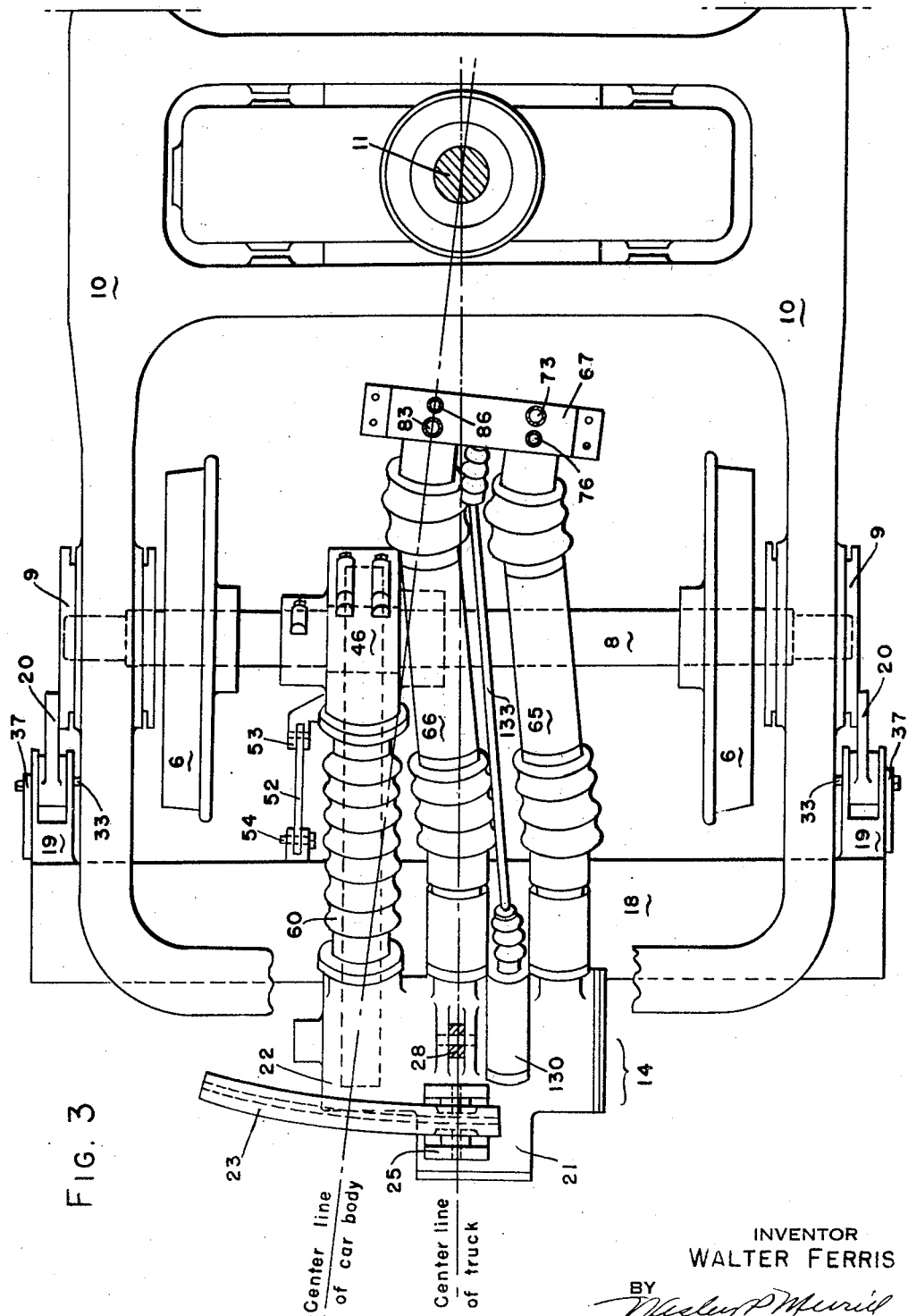

INVENTOR
WALTER FERRIS
BY
ATTORNEY

Patented Dec. 6, 1949

2,490,515

UNITED STATES PATENT OFFICE 2,490,515

POWER TRANSMISSION AND SUPPORT THEREFOR

Walter Ferris, Milwaukee, Wis., assignor to The Oilgear Company, Milwaukee, Wis., a corporation of Wisconsin Application February 5, 1945, Serial No. 576,242

20 Claims. (Cl. 105—110)

1

This invention relates to power transmissions of the type consisting primarily of two power units one of which functions as a generator and the other of which functions as a motor. A transmission to which the invention relates in particular has one of its power units mechanically connected to the axle of a vehicle to drive the same or to be driven therefrom. The invention is particularly adapted for use on railway cars having an air conditioning apparatus carried by the body of the car and driven from the car axle but it is also adapted for other uses such as on a locomotive having an axle thereof driven by a motor which is energized by a generator carried by the body of the locomotive.

The axles of railway cars and the driving axles of locomotives are each mounted near the ends thereof in journal boxes which are slidable vertically in a truck frame or undercarriage, and the body of a car or locomotive is supported from the journal boxes through springs which permit the axle to move vertically relatively to the body and also permit one end of the axle to move vertically relatively to the other end thereof. An axle of a railway car is adapted to swing horizontally in an arc relative to the car body for the reason that the body is pivotally supported upon the trucks in order that the trucks may pivot beneath the body when the car is passing around a curve in the track.

In a transmission having one of its power units connected by a drive to an axle of a vehicle, distortion of the drive should be avoided to thereby avoid undue loss of power and excessive wear of the parts.

The present invention has as an object to provide a vehicle with a transmission having one of its power units connected to an axle of the vehicle by a drive and so supported that any material distortion or misalinement of the drive is avoided.

Another object is to provide a transmission in which a power unit is connected to the axle of a vehicle by a drive and the power unit is adjustable relative to the axle to thereby adjust the drive.

Another object is to provide a power unit with a support which is supported at least in part by an axle of a vehicle in such a manner that the axle may readily be removed and replaced by another axle without disturbing the support.

Another object is to provide a shield for enclosing the drive between a power unit and an axle.

Another object is to provide the drive between an axle and a power unit with a shield having a

2 separable portion to permit the axle to be removed from the truck.

Other objects and advantages will appear from the description hereinafter given of transmissions in which the invention is embodied.

The invention is exemplified by the structures shown in part in detail and in part schematically in the accompanying drawings in which the views are as follows:

Fig. 1 is a side view partly in section of two portions of a railway car having a compartment suspended from the car body and its lighting and air conditioning apparatus arranged within the compartment and adapted to be driven by a hydraulic motor which is connected by fluid channels to a pump which is driven from the car axle and supported in part by two journal boxes and in part from the body of the car.

Fig. 3 is a plan view taken in the plane indicated by the arrows 2—2 on Fig. 1 and showing the parts in the positions occupied when the car is on a curve of minimum radius, a part of the truck frame being broken away to expose other parts.

Fig. 4 is an enlarged sectional view taken on the line 4—4 of Fig. 2 and showing the drive for the pump and the shield for enclosing the drive.

Fig. 5 is an enlarged view taken on the line 5—5 of Fig. 2 and showing a device for preventing rotation of a portion of the shield shown in Fig. 4.

Fig. 6 is a section taken on the irregular line 6—6 of Fig. 4.

Fig. 7 is a section taken through a device for adjusting the drive shown in Fig. 4, the view being taken on the line 7—7 of Fig. 1 and drawn to a larger scale.

Fig. 8 is a side view of the device shown in Fig. 7.

Fig. 9 is a view showing the device by means of which the pump is supported in part from the body of the car, the view being taken on the line 9—9 of Fig. 1.

Figure 1:
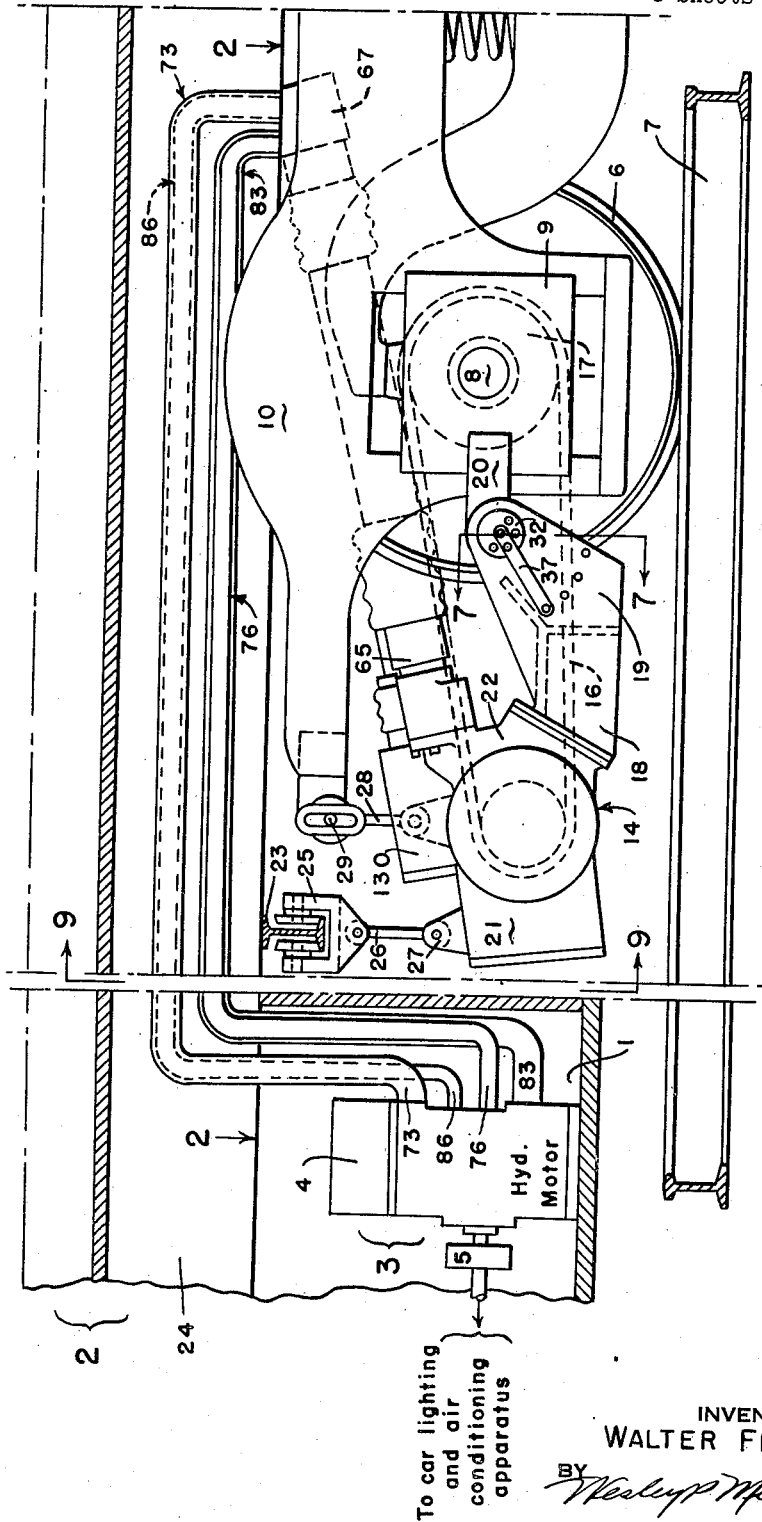
Figure 2:
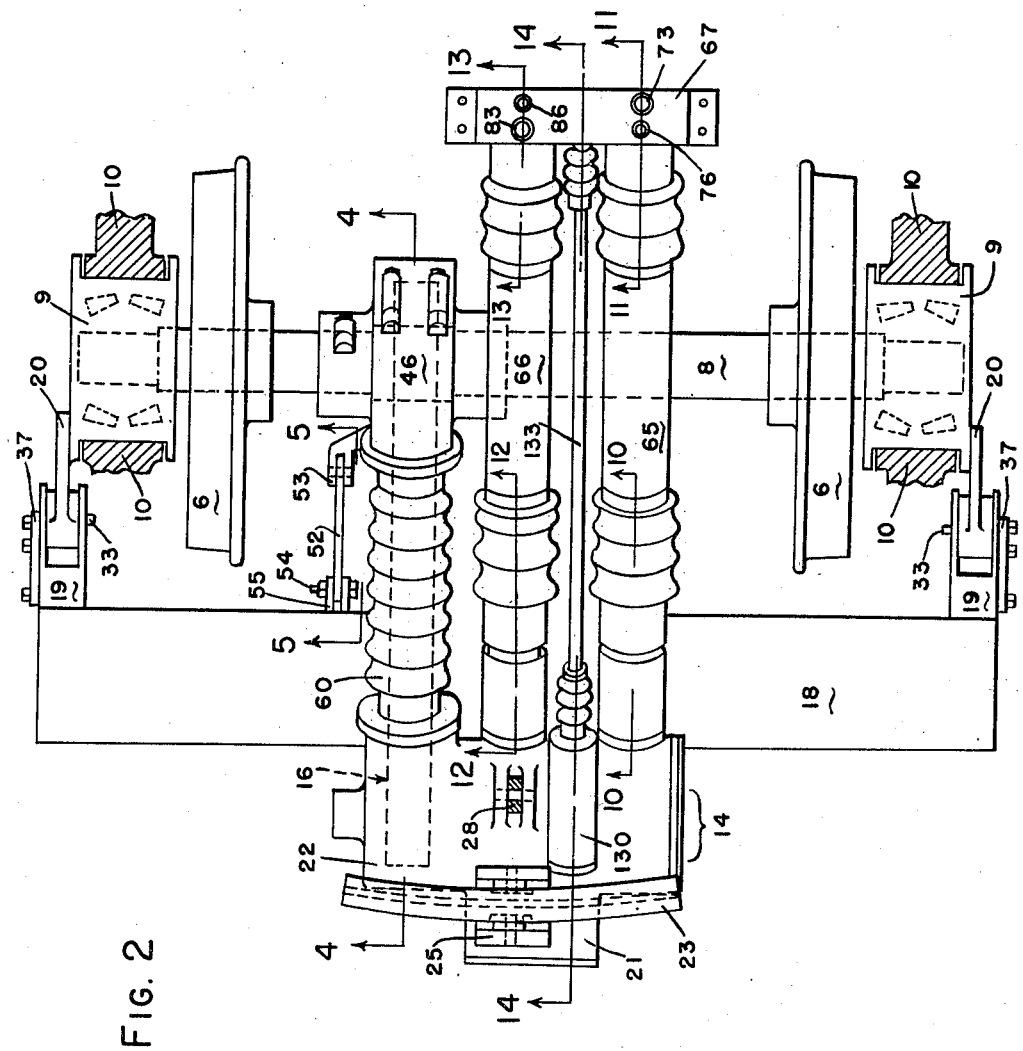
Fig. 2 is a plan view taken in the plane indicated by the arrows 2—2 on Fig. 1 but with the truck frame omitted except for portions thereof adjacent the journal boxes.

Figs. 10 and 11 are longitudinal sections through the end portions of one of the slide pipes shown in Figs. 1, 2 and 3, the views being taken, respectively, on the lines 10—10 and 11—11 of Fig. 2 and drawn to a larger scale.

Figure 12:
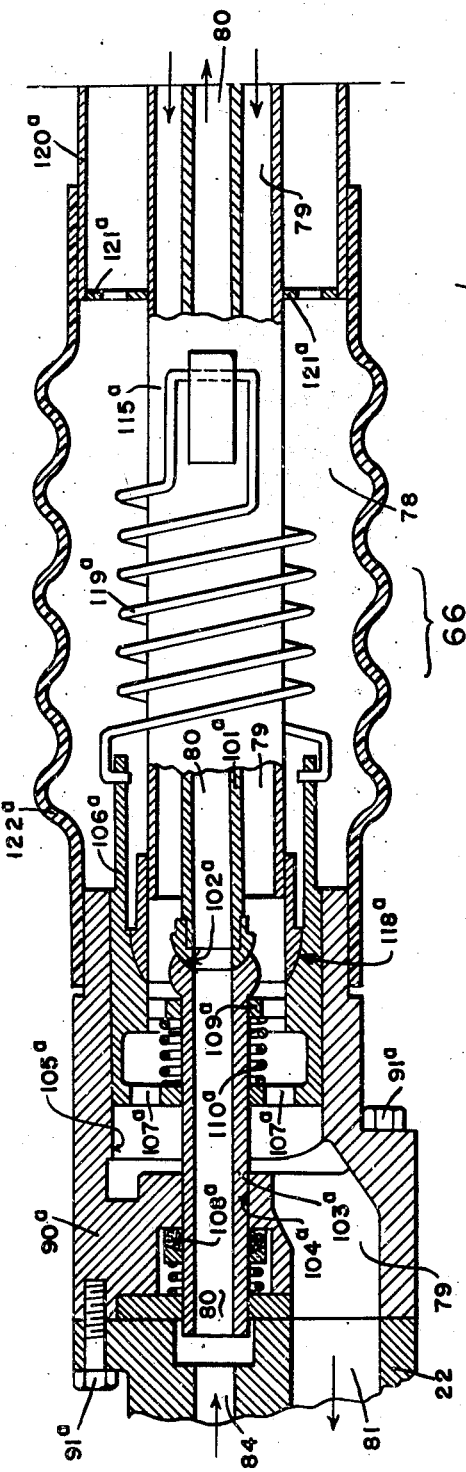
Figure 13:
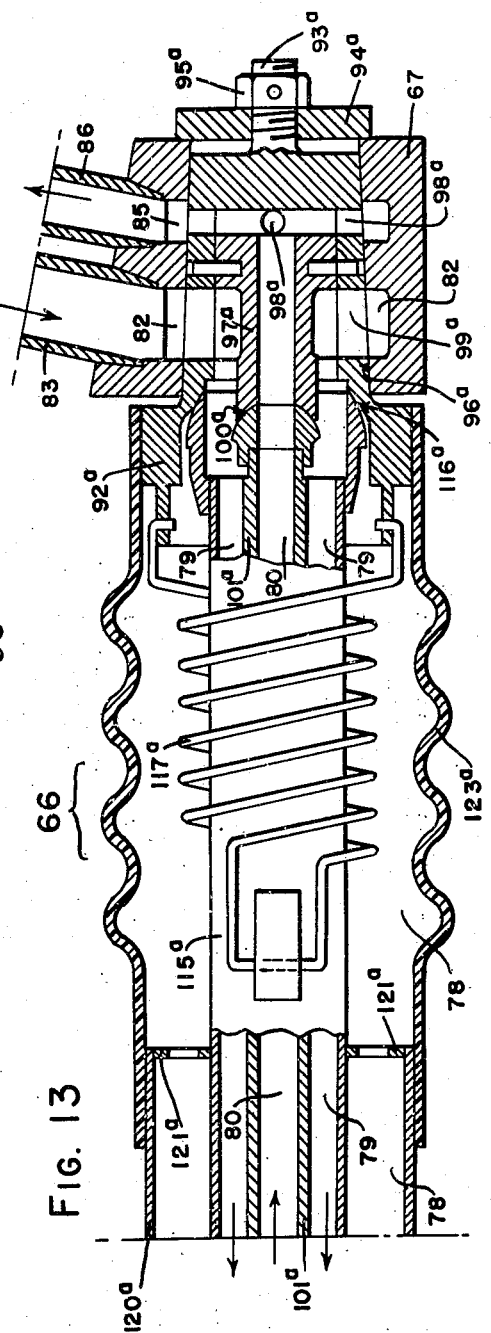

Figs. 12 and 13 are longitudinal sections through the end portions of the other slide pipes, the views being taken, respectively, on the lines 12—12 and 13—13 of Fig. 2 and drawn to a larger scale.

Fig. 14 is a longitudinal section through a device for opposing the hydraulic forces which act longitudinally upon the parts of the slide pipes, the view being taken on the line 14—14 of Fig. 2 and drawn to a larger scale.

Fig. 15 is a view somewhat similar to Fig. 1 but showing the left end of the pump support suspended from the truck frame and the pump connected by flexible hose to the fluid channels carried by the body of the car.

Fig. 16 is a section taken on the line 16—16 of Fig. 15 and drawn to a larger scale.

Since air conditioned railway cars are well known, only so much of the car has been illustrated as is necessary to show the application of the invention thereto. As shown in Fig. 1, the car has a compartment 1 suspended from the car body 2 and enclosing a hydraulic motor 3 which is adapted to drive the car lighting and air conditioning apparatus not shown. Motor 3 may be of the constant displacement type or it may be a variable displacement motor and be provided with a suitable control arranged within a housing 4.

The car lighting and air conditioning apparatus is assumed to include an air conditioner, an A. C. motor-generator and a D. C. motor-generator. When the A. C. motor-generator is driven, it supplies current for lighting the cars and, when it is energized by current from a source outside the car, it drives the D. C. motor-generator and the air conditioner. When the D. C. motor-generator is driven, it supplies current for charging the car batteries and, when it is energized by current from the batteries, it drives the A. C. motor-generator and the air conditioner. In order that hydraulic motor 3 may drive the apparatus but not be driven by one or the other of the motor-generators, it is connected thereto through an over-running clutch 5.

Car body 2 is pivotally supported in the usual manner upon a pair of trucks each of which has a pair of wheels arranged at each end thereof to support the car upon the track but only a portion of one truck has been shown as the car per se forms no part of the present invention.

In the portion shown, a pair of wheels 6 is supported upon a track 7 and fixed upon an axle 8 having opposite ends thereof mounted in a pair of journal boxes 9 which are slidable vertically in opposite sides of the frame 10 of the truck and support car body 2 through springs as is well known, car body 2 ordinarily being pivotally connected to each truck at its center as by means of a center bearing 11 (Fig 3).

Hydraulic motor 3 is adapted to be energized by liquid supplied thereto from a reversible variable displacement pump 14 which is arranged beneath the car. As shown in Fig. 4, the shaft 14<sup>a</sup> of pump 14 has a chain wheel 15 fixed thereon and connected by a silent chain 16 to a chain wheel 17 which is fixed upon axle 8 so that pump 14 is driven whenever the car is in motion.

Pump 14 is fixed to a rigid crossbeam 18 which has a pair of arms 19 fixed to its opposite ends and extending from one side thereof as shown in Figs. 1 and 2. The two arms 19 are connected, respectively, to two lugs 20 which are welded or otherwise rigidly secured, respectively, to the two journal boxes 9 and support crossbeam 18 at one side thereof.

The other side of crossbeam 18 may be suspended by means of a hanger from the car body as shown in Fig. 1 or from the truck frame as shown in Fig. 15. The hanger may be connected directly to crossbeam 18 but with the types of pump and truck frame shown, it is preferably connected to a housing 21 which encloses the control mechanism for pump 14. Housing 21 is fixed to or formed integral with a housing 22 which encloses pump 14 and is fixed to crossbeam 18 so that housings 21 and 22 and crossbeam 18 form a rigid support for pump 14.

As shown in Figs. 1, 2 and 9, the hanger for the pump support may include a curved track such as an I-beam 23 which is fixed by its upper flange to the center sill 24 of the car body, a trolley 25 which is mounted upon the lower flange of track 23, and a link 26 which is pivotally connected to trolley 25 and to suitable lugs 27 fixed to housing 21 upon the centerline of the pump support.

When the car passes around a curve, the truck will pivot beneath the car body and trolley 25 will move along curved track 23, as shown in Fig. 3, so that hanger 25—26 remains substantially vertical at all times. In order to prevent the pump support from dropping upon track 7 in case hanger 25—26 should fail, a link 28 has its lower end pivoted to housing 22 and its upper end slotted to receive a pin 29 carried by truck frame 10.

Since the car body is supported upon springs, it will move vertically relative to axle 8 and it will sway and lurch due to curves and to unevenness of the track. Swaying and lurching of the car body will not cause any lateral or tilting movement of the pump support for the reason that hanger 25—26 is connected to the pump support upon the centerline thereof. Vertical movements of the car body, however, will be transmitted to the pump support through hanger 25—26 and, in order that the pump support may pivot relatively to the axle and to permit adjustment of driving chain 16, the pump support is pivoted to lugs 20 by eccentric pins which may be rotated to move the pump support toward or from the axle.

As shown, each arm 19 is bifurcated to provide two flanges which engage opposite faces of a lug 20. The outer and inner flanges are bored to receive, respectively, a large diameter end portion 32 and a concentric small diameter end portion 33 of a pin having an intermediate eccentric portion 34 journaled in the lug 20. (Fig. 7.) Lug 20 may have a bore just the right size to receive eccentric portion 34 but preferably a rubber or other resilient bushing 35 is interposed between the eccentric portion 34 and the wall of the bore to absorb vibrations and to prevent small movements from being transmitted from the car wheels to the pump support. In order to prevent undue wear of bushing 35, a tubular metallic bearing 36 is closely fitted therein and eccentric portion 34 is journaled in bearing 36.

The arrangement is such that the pump support may pivot upon lugs 20 in response to vertical movements of car body 2 relative to axle 8 while eccentric pins 32—34 positively retain the pump support in parallelism with axle 8 and, since hanger 25—26 is connected to the pump support at a single point upon the centerline thereof and its upper end is movable transversely of car body 2 so that the pump support cannot be moved laterally or tilted by movement of car body 2, chain wheel 15 (Fig. 4) on pump shaft 14<sup>a</sup> is maintained in alinement with chain wheel 17 on axle 8.

Each eccentric pin 32—34 is adapted to be rotated by a lever 37 which is connected at one end, as by means of a bolt 38, to pin 32—34 upon the axis thereof and which is also connected to pin 32—34 by a cap screw 39 inserted through lever 37 and threaded into any one of a plurality of holes 40 which are formed in large portion 32 upon an arc spaced from the axis of the pin. The other end of lever 37 is adapted to be secured in adjusted positions by means of a cap screw 41 which may be threaded into any one of a plurality of holes 42 formed in the outer flange of arm 19.

The arrangement is such that, when cap screws 41 are removed and both levers 37 are swung in one direction or the other, eccentric pins 32—34 will be rotated in arms 19 and in lugs 20 and will move the pump support toward or from axle 8 to thereby adjust chain 16 until it is neither too tight nor too loose.

If the throw of the eccentric portions 34 of pins 32—34 is insufficient to properly adjust chain 16 during movement of levers 37 from one to another of holes 42, cap screws 39 may be removed and levers 37 swung upon bolts 38 to new positions and fastened in those positions by inserting cap screws 39 in other holes 40.

Chain 16 is preferably arranged within an inclosure which contains lubricant for the chain and which protects the chain from dust and other foreign matter. As shown in Fig. 4, chain wheel 15 and a portion of chain 16 are arranged within the end portion of pump housing 22. Chain wheel 17 and another portion of chain 16 are arranged within a housing consisting of a body 46 and a detachable cap 47 which are fastened together by a plurality of bolts 48.

As shown in Fig. 6, housing 46—47 is supported upon axle 8 by six rollers or ball bearings 49 three of which are arranged upon each side of wheel 17 and each of which is carried by a stub shaft 50 fixed in an end wall of housing 46—47.

Rollers 49 may bear directly upon axle 8 but preferably each set of three rollers 49 bears upon a hardened sleeve 51 two of which are fixed upon the enlarged central portion of axle 8 and extend into or through opposite ends of housing 46—47. The bores in the end walls of housing 46—47 are slightly larger in diameter than sleeves 51 to provide therebetween clearance which ordinarily is so small that it has not been shown in the drawing. This clearance is filled with hard grease which provides a seal to prevent dust from entering the housing and to prevent escape of lubricant therefrom.

Rotation of housing 46—47 is prevented by a link 52 (Figs. 2 and 5) which has its right end pivoted to a lug 53 fixed to housing body 46 and its left end connected by a bolt 54 to a lug 55 fixed to crossbeam 18. Bolt 54 is removed before crossbeam 18 is shifted to adjust chain 16 and, after adjustment is made, bolt 54 is inserted through lug 55 and the proper one of a plurality of holes 56 formed in the left end of link 52.

As shown in Fig. 4, the lower reach of chain 16 extends through crossbeam 18 which is hollow and forms a reservoir 57 from which the hydraulic circuit is supplied with motive liquid. A passage through reservoir 57 is provided by a continuous wall 58 which is fixed to or formed integral with the side walls of crossbeam 18 and extends around the path of chain 16. That portion of the lower reach of chain 16 between crossbeam 18 and housing part 46 is enclosed within an extensible and contractible tube 59 which has its ends attached to crossbeam 18 and housing part 46 respectively.

The upper reach of chain 16 is enclosed within an extensible and contractible tube 60 which has one end connected to housing 22 and its other end connected to housing body 46. Tubes 59 and 60 will contract or stretch when the pump support is moved toward or from axle 8 by rotation of eccentric pins 32—34.

Motor 3 is provided with a control which automatically varies motor displacement to maintain the motor speed substantially constant after it has reached a predetermined maximum speed, and pump 14 is provided with a control which causes it to discharge liquid in the same direction regardless of direction of car movement and which maintains pump displacement at maximum until the car speed has reached a given intermediate speed, such as 25 M. P. H., and thereafter varies pump displacement inversely to variations in car speed above the intermediate speed to thereby enable motor 3 to drive the car lighting and air conditioning apparatus at a substantially constant speed whenever the car is moving at or above the predetermined intermediate speed as fully explained in my co-pending application Serial No. 576,243, filed February 5, 1945, now Patent No. 2,477,974.

Motor 3 and pump 14 may each be of any suitable type but they have been indicated as being of the sliding vane type. Hydrodynamic machines of the sliding vane type are well known and, since the essential features of motor 3 and pump 14 are explained in the above mentioned application, they have not been illustrated in detail. It is deemed sufficient to state herein that each includes a rotor having radial vane slots formed therein and vanes slidably fitted in the slots, the rotor of pump 14 being fixed upon shaft 14$^a$ to be driven thereby from axle 8 and the rotor of motor 3 being connected to clutch 5 to drive the same when motor 3 is energized by liquid delivered thereto from pump 14.

The outer ends of the vanes of each machine ride upon an endless vane track which extends around the rotor and is approximately elliptical when the machine is performing useful work. The vane track includes two diametrically opposed sealing bridges which are arranged close to the periphery of the rotor and two working bridges which are located 90° from the sealing bridges and are spaced from the periphery of the rotor when the machine is performing useful work. An inlet port and a discharge port are arranged upon opposite sides of each bridge and the vanes in contact with the bridges provide seals between adjacent ports.

In pump 14, liquid is drawn from the inlet port into the space between the rotor and the vane track as the vanes pass from a sealing bridge to a working bridge and it is expelled through the discharge port as the vanes pass from a working bridge to a sealing bridge. The liquid discharged by pump 14 acts upon the outer end portions of the motor vanes in contact with the working bridges and causes the rotor of motor 3 to rotate and drive clutch 5. The liquid discharged by motor 3 is returned to the intake of pump 14.

The vanes move outward as they pass from a sealing bridge to a working bridge and they are forced inward as they move from a working bridge to a sealing bridge. The slots of the outward moving pump vanes are ordinarily supplied with liquid by an auxiliary pump and the inward moving pump vanes expel liquid from their slots and this liquid flows to the slots of the outward moving motor vanes and holds those vanes in contact with the vane track. The inward moving motor vanes expel liquid from their slots and this liquid flows to the slots of the outward moving pump vanes.

There are thus required two separate circuits, one being a main circuit for the liquid which drives motor 3 and the other being a vane root circuit for the liquid which holds the vanes against the vane tracks of pump 14 and motor 3. Since pump 14 moves laterally through a substantial distance relative to car body 2 when the car passes around a curve as indicated in Fig. 3 and since car body 2 tilts relative to axle 8 as previously explained, the circuits must include flexible portions to permit pump 14 to move in all directions relative to body 2. The flexible portions may comprise lengths of flexible hose as indicated in Fig. 15 or the circuits may include slide pipes having flexible portions.

As shown in Figs. 1 and 2, the housing 22 of pump 14 is connected by two slide pipes 65 and 66 to a manifold 67 which is fixed to car body 2 upon the underside thereof. Since slide pipes 65 and 66 cannot be connected to car body 2 at the point at which it is pivoted to the truck for the reason that that point is occupied by center bearing 11, rotation of the truck relative to car body 2 causes a variation in the lengths of slide pipes 65 and 66 but manifold 67 is preferably located as near center bearing 11 as conveniently possible to thereby keep the variations in the lengths of slide pipes 65 and 66 at a minimum.

As shown in Figs. 10 and 11, slide pipe 65 contains an outer annular passage 68 which collects leakage from the vane root circuit and discharges it into reservoir 57 through a passage not shown, an annular passage 69 which is arranged within passage 68 and forms a part of the return side of the vane root circuit, and a central passage 70 which is arranged within passage 69 and forms a part of the pressure side of the main circuit.

Passage 70 communicates at its left end with the discharge port 71 of pump 14 and it communicates at its right end with a port 72 which is formed in manifold 67 and connected by a channel 73 (Fig. 1) to the inlet port of motor 3. The left end of passage 69 communicates with a port 74 which is formed in pump housing 22 and communicates with the vane slots of the outward moving vanes of pump 14 and the right end of passage 69 communicates with a port 75 which is formed in manifold 67 and connected by a channel 76 to a port (not shown) which is formed in motor 3 and communicates with the vane slots of the inward moving motor vanes.

As shown in Figs. 12 and 13, slide pipe 66 contains an outer annular passage 78 which collects leakage from the return side of the main circuit and discharges it into reservoir 57 through a passage not shown, an annular passage 79 which is arranged within passage 78 and forms a part of the return side of the main circuit, and a central passage 80 which is arranged within passage 79 and forms a part of the pressure side of the vane root circuit.

Passage 79 communicates at its left end with the intake port 81 of pump 14 and it communicates at its right end with a port 82 which is formed in manifold 67 and connected by a channel 83 (Fig. 1) to the discharge port of motor 3. The left end of passage 80 communicates with port 84 which is formed in pump housing 22 and communicates with the vane slots of the inward moving vanes of pump 14 and the right end of passage 80 communicates with a port 85 which is formed in manifold 67 and connected by a channel 86 to a port (not shown) which is formed in motor 3 and communicates with the vane slots of the outward moving pump vanes.

The arrangement is such that any liquid leaking from the high pressure side of either circuit enters the low pressure side of the other circuit and any liquid leaking from the low pressure side of either circuit enters the outer annular passage 68 or 78 and then flows to reservoir 57.

In order that slide pipe 65 may be connected between pump housing 22 and manifold 67, it includes a left end section 90 (Fig. 10) which is rigidly secured to housing 22, as by means of bolts 91, and a right end section 92 (Fig. 11) which has a portion thereof tapered and tightly fitted in a complementary bore formed in manifold 67. Section 92 has a stud 93 fixed to the end thereof and extending through a plate 94 arranged upon the end of manifold 67. A nut 95 threaded upon stud 93 may be tightened against plate 94 to wedge section 92 into manifold 67 and thereby provide a liquid tight joint therebetween.

End section 92 has an axial bore 96 formed therein and a tubular element 97 is arranged within bore 96 with its right end portion tightly fitted therein to provide a liquid tight joint. Element 97 may be fixed in position by one or more suitable pins fitted in its wall and in the wall of section 92. The bore of element 97 forms a part of passage 70 and communicates with port 72 in manifold 67 through a plurality of radial passages 98 which are formed in section 92.

The left portion of element 97 is smaller in diameter than bore 96 and the space between the periphery of that portion of element 97 and the wall of bore 96 forms a part of passage 69 and communicates with port 75 in manifold 67 through a plurality of radial passages 99 which are formed in section 92.

The left end of element 97 is provided with one part of an annular ball and socket joint 100 the other part of which is arranged upon the right end of a pipe 101 which constitutes the intermediate portion of passage 70. The left end of pipe 101 is provided with one part of an annular ball and socket joint 102 (Fig. 10) the other part of which is arranged upon the adjacent end of a pipe 103 which constitutes the left portion of passage 70 and extends through end section 90 into communication with port 71. Passage 70 is thus formed by pipes 101 and 103, element 97 and passages 98 so that liquid may flow freely from port 71 in pump housing 22 to port 72 in manifold 67.

End section 90 contains an axial bore 104, a counterbore 105 which is concentric with bore 104 and has a hollow piston 106 closely fitted therein, and a portion of passage 69 which is arranged at one side of bore 104 and communicates with counterbore 105 and with port 74 in pump housing 22.

Pipe 103 is closely fitted in bore 104 to slide therein and it extends loosely through the head of piston 106 which also has a plurality of passages 107 formed therein to provide communication between counterbore 105 and the interior of piston 106. The left end of bore 104 is enlarged and an oil seal 108 is arranged therein to prevent leakage of liquid from port 71 into counterbore 105.

A plurality of lugs 109 are formed upon pipe 103 in an annular row adjacent joint 102 and are spaced apart to permit free flow of liquid through passage 69. A spring 110 is arranged around pipe 103 between lugs 109 and the head of piston 106 to urge pipe 103 against pipe 101 and pipe 101 against element 97 to thereby initially keep joints 100 and 102 tight. When pump 14 is delivering liquid under pressure to motor 3, joints 100 and 102 are kept tight by spring 110 and by pump pressure acting upon the left end of pipe 103.

Pipe 101 is arrange inside of a pipe 115 which is large enough to provide between its inner periphery and the outer periphery of pipe 101 a space which forms the portion of passage 69 between end section 92 and piston 106.

End section 92 (Fig. 11) has formed upon its inner wall an annular spherical surface which forms one part of a ball and socket joint 116 the other part of which is arranged upon the right end of pipe 115. Joint 116 is kept tight initially by a coil spring 117 which urges pipe 115 toward the right and has one of its ends connected to pipe 115 and its other end connected to the skirt of end section 92. Piston 106 (Fig. 10) likewise has formed upon its inner wall an annular spherical surface which forms one part of a ball and socket joint 118 the other part of which is arranged upon the left end of pipe 115. Joint 118 is kept tight initially by a coil spring 119 which urges piston 106 toward the right and has one of its ends connected to pipe 115 and its other end connected to the skirt of piston 106.

Passage 69 thus includes the portion thereof that is formed in end section 90 and communicates with port 74, counterbore 105, passages 107, the interior of piston 106, the space between pipes 101 and 115, the space between the outside of element 97 and the wall of bore 96 in end section 92, and passages 99 which communicate with port 75 in manifold 67. Therefore, liquid may flow freely from port 75 to port 74.

Coil springs 117 and 119 must have sufficient tension to overcome the opposing force exerted by spring 110 and must also urge piston 106 toward the right with sufficient force to keep ball and socket joints 100 and 102 tight. Any pressure in passage 69 acts upon piston 106 and assists springs 117 and 119 in keeping joints 100 and 102 tight.

Pipe 115 has its central portion arranged within a considerably larger pipe 120 which is spaced from pipe 115 by apertured separators 121 to provide a space which forms a part of passage 68. The left end portion of pipe 115 is enclosed within a flexible shield 122 which has its ends sealed to pipe 120 and to end section 90, respectively, and provides a second portion of passage 68. The right end portion of pipe 115 is enclosed within a flexible shield 123 which has its ends sealed to pipe 120 and to end section 92, respectively, and provides a third portion of passage 68.

The arrangement is such that any liquid leaking from high pressure passage 70 through joints 100 and 102 or past seal 108 enters low pressure passage 69 and any liquid leaking from low pressure passage 69 through joints 116 and 118 or past piston 106 is collected in passage 68 and drained therefrom into reservoir 57 through a passage arranged in a plane not shown in the drawings.

Slide pipe 66 is substantially the same as slide pipe 65 except that passage 80 is smaller than passage 70 and passage 79 is larger than passage 69. Therefore, a detailed description of a slide pipe 66 is deemed unnecessary since corresponding parts have been indicated by corresponding reference numerals with the exponent "a" added to the reference numerals applied to slide pipe 66.

Pipes 101ª and 103ª and element 97ª are smaller in diameter than pipes 101 and 103 and element 97, respectively, for the reason that they form parts of the high pressure side of the vane root circuit, which carries considerably less liquid than the main circuit, put pipe 115ª may be the same size as pipe 115 since decreasing the diameter of pipe 101ª correspondingly increases the space between its outer periphery and the inner periphery of pipe 115ª.

Any liquid leaking from high pressure channel 80 enters channel 79 which forms a part of the low pressure side of the main circuit, and any liquid leaking from channel 79 is collected in channel 78 and drained therefrom into reservoir 57 through a passage arranged in a plane not shown in the drawings.

Ball and socket joints 100, 100ª, 116, and 116ª and flexible shields 123 and 123ª permit slide pipes 65 and 66 to bend in any direction at a point near manifold 67. Ball and socket joints 102, 102ª, 118 and 118ª and flexible shields 122 and 122ª permit slide pipes 65 and 66 to bend in any direction at a point near pump housing 22. Pipes 103 and 103ª, pistons 106 and 106ª and flexible shields 122 and 122ª permit slide pipes 65 and 66 to vary in length. Therefore, pump 14 may move vertically relative to axle 8 and in any direction relative to car body 2 while slide pipes 65 and 66 maintain substantially fluid tight channels between pump housing 22 and manifold 67.

Slide pipes 65 and 66 are not specifically claimed herein as they are claimed in Patent No. 2,462,734.

The high pressure liquid in passage 70 and the high pressure liquid in passage 80 exert considerable forces upon pump housing 22 and on manifold 67 and tend to push them apart. In order to largely neutralize these forces and to reduce the net reactions delivered to pump casing 22 and to manifold 67 by the slide pipes when under pressure, the device shown in Figs. 2 and 14 is provided. This device includes a cylinder 130 which is fixed to or formed integral with pump housing 22, a piston 131 which is fitted in cylinder 130 and has an integral piston rod 132 extending through one end thereof, and a rod 133 which is connected to piston rod 132 by a universal joint 134 and to manifold 67 by universal joint 135. Joints 134 and 135 are preferably enclosed within flexible dust proof boots 136 and 137 respectively. The head end of cylinder 130 is connected by a drain passage 138 to the interior of pump housing 22 and the rod end of cylinder 130 is connected by a passage 139 (Figs. 10 and 14) to high pressure port 71 so that the rod end of piston 131 is at all times subjected to the pressure created by pump 14.

The arrangement is such that, when pump 14 is creating pressure, pump housing 22 and manifold 67 are urged toward each other by piston 131 with a force which is proportional to the slide pipe forces tending to move pump housing and manifold 67 away from each other and therefore tending to move or rotate the truck relatively to the car body. The opposing pull of piston 131 is not made equal to the slide pipe forces because the pull of chain 16 must also be considered. As the car moves in one or the other direction, the upper or the lower strand of chain is tight. When the upper strand is tight it strongly assists piston 131 in opposing the slide pipe forces. When the lower strand is tight its force is resisted principally by eccentric pins 32—34, and the pull of piston 131 would have to be larger to balance the slide pipe forces. Hence, a size is chosen for piston 131 which gives an average balancing force, leaving a moderate excess or deficiency to be opposed by the supports of pump housing 22 and manifold 67.

When the car moves in one direction or the other, pump 14 will be driven in one direction or the other but it will discharge liquid in only one direction regardless of the direction of car movement, and its axis will remain parallel to the axis of axle 8 regardless of relative movements of car body 2 and axle 8 as previously explained.

The liquid discharged by pump 14 will flow through channels 70 and 73 to motor 3 and drive it, the liquid discharged by motor 3 will be returned to pump 14 through channels 83 and 79, the liquid expelled by the inward moving pump vanes will flow through channels 80 and 86 to motor 3 and hold the outward moving motor vanes against the vane track, and the liquid expelled by the inward moving motor vanes will flow through channels 76 and 69 to pump 14 and supply liquid to the outward moving pump vanes.

When the car is stationary and at low car speeds, the car lighting and air conditioning apparatus is driven by one of its own electric motors but, when the car reaches an intermediate speed, pump 14 delivers liquid to motor 3 at a rate high enough to cause motor 3 to run fast enough to pick up the load through overrunning clutch 5 and thereafter at all car speeds above the intermediate speed the car lighting and air conditioning apparatus will be driven by motor 3.

*Figs. 15 and 16*

Instead of employing slide pipes 65 and 66 as parts of the hydraulic circuit, liquid may be transmitted between pump 14 and the fluid channels on car body 2 through sections of flexible hose each of which is long enough to permit the truck to turn through the maximum angular distance without stretching or breaking the hose.

As shown, channel 73 on car body 2 is connected to pump housing 22 by a flexible hose 145 which corresponds to passage 70 in slide pipe 65; channel 76 on car body 2 is connected to pump housing 22 by a flexible hose 146 which corresponds to passage 69 in slide pipe 65; channel 83 on car body 2 is connected to pump housing 22 by a flexible hose 147 which corresponds to channel 79 in slide pipe 66; and channel 86 on car body 2 is connected to pump housing 22 by a flexible hose 148 which corresponds to passage 80 in slide pipe 66 so that the flow both in the main circuit and in the vane root circuit is the same as explained above.

Regardless of whether pump 14 and the fluid channels on car body 2 are connected to each other by slide pipes or by flexible hose, the left side of pump support 18—22 may be suspended from truck frame 10 instead of from car body 2. As shown in Fig. 15, a pair of lugs 149 is fixed to pump housing 22 upon the centerline of the pump support and a hanger 150 has its lower end arranged between lugs 149 and connected thereto by a pin 151 and its upper end arranged between and connected by a pin 152 to a pair of lugs 153 which are fixed to truck frame 10 upon the centerline thereof.

In order to compensate for unequal movements of the two journal boxes 9 in frame 10, to cushion shocks and to absorb vibrations which would otherwise be transmitted to the pump support, an annular bushing 154 of rubber or other resilient material may be fitted in the upper end of hanger 150 and provided with an internal metal sleeve 155 in which pin 152 is fitted, as shown in Fig. 16, and the lower end of hanger 150 may be provided with a similar bushing 156.

The invention herein set forth is susceptible of various modifications and adaptations without departing from the scope thereof. The invention is hereby claimed as follows:

1. In a vehicle having a body, a hydraulic motor carried by said body, a pair of journal boxes arranged beneath said body, an axle journaled in said boxes and provided with wheels for supporting said vehicle, and means for supporting said body from said journal boxes, the combination of a pump for supplying liquid to said motor, means for pivotally supporting said pump at one side thereof from said journal boxes, other means for pivotally supporting said pump at the other side thereof, and a drive connecting said pump to said axle to transmit rotary motion from one to the other.

2. In a vehicle having a body, a pair of journal boxes arranged beneath said body, an axle journaled in said boxes and provided with wheels for supporting said vehicle, and means for supporting said body from said journal boxes, the combination of a rotary power unit, means for pivotally supporting said power unit at one side thereof from said journal boxes, other means for supporting said power unit at the other side thereof, a flexible drive connecting said unit to said axle to transmit rotary motion from one to the other, and means for moving said unit relative to said axle to thereby adjust said drive.

3. In a vehicle having a body, a pair of journal boxes arranged beneath said body, an axle journaled in said boxes and provided with wheels for supporting said vehicle, and means for supporting said body from said journal boxes, the combination of a rotary power unit supported in part by said journal boxes, a first wheel connected to said power unit to rotate therewith, a second wheel fixed upon said axle, a flexible drive connecting said wheels to transmit rotary motion from one to the other, a housing enclosing said second wheel and including a removable portion to permit said axle to be removed from said housing, roller bearings for supporting said housing from said axle, and means for preventing rotation of said housing.

4. In a vehicle having a body, a pair of journal boxes arranged beneath said body, an axle journaled in said boxes and provided with wheels for supporting said vehicle, and means for supporting said body from said journal boxes, the combination of a rotary power unit supported in part by said journal boxes, a first wheel connected to said power unit to rotate therewith, a second wheel fixed upon said axle, a flexible drive connecting said wheels to transmit rotary motion from one to the other, a housing enclosing said second wheel, a plurality of shafts carried by said housing and arranged around said axle, rollers carried by said shafts to support said housing from said axle, and means for preventing rotation of said housing.

5. In a vehicle having a body, a pair of journal boxes arranged beneath said body, an axle journaled in said boxes and provided with wheels for supporting said vehicle, and means for supporting said body from said journal boxes, the combination of a rotary power unit supported in part by said journal boxes, a first wheel connected to said power unit to rotate therewith, a second wheel fixed upon said axle, a flexible drive connecting said wheels to transmit rotary motion from one to the other, a housing enclosing said first wheel, a second housing enclosing said second wheel, roller bearings for supporting said second housing from said axle, and two tubes connected between said housing and enclosing the upper and lower reaches of said drive.

6. In a vehicle having a body, a pair of journal boxes arranged beneath said body, an axle journaled in said boxes and provided with wheels for supporting said vehicle, and means for supporting said body from said journal boxes, the combination of a rotary power unit supported in part by said journal boxes, a first wheel connected to said power unit to rotate therewith, a second wheel fixed upon said axle, a flexible drive connecting said wheels to transmit rotary motion from one to the other, means for moving said unit relative to said axle to thereby adjust said drive, a housing enclosing said first wheel, a second housing enclosing said second wheel, and extensible shields connected between said housings and enclosing the upper and lower reaches of said drive to protect the same while permitting said power unit to be moved relative to said axle.

7. In a vehicle having a body, a pair of journal boxes arranged beneath said body, an axle journaled in said boxes and provided with wheels for supporting said vehicle, and means for supporting said body from said journal boxes, the combination of a rotary hydrodynamic machine supported in part by said journal boxes, a drive connecting said machine to said axle to transmit rotary motion from one to the other, a second hydrodynamic machine carried by said body, and fluid channels connecting said machines to direct liquid from one to the other and including slide pipes each of which is extensible and includes universal joints to compensate for bodily movement of said first machine relative to the body of said vehicle.

8. In a vehicle having a body, a pair of journal boxes arranged beneath said body, an axle journaled in said boxes and provided with wheels for supporting said vehicle, and means for supporting said body from said journal boxes, the combination of a rotary hydrodynamic machine supported in part by said journal boxes, a flexible drive connecting said machine to said axle to transmit rotary motion from one to the other, means for moving said machine relative to said axle to thereby adjust said drive, a second hydrodynamic machine carried by said body, and fluid channels connecting said machines to direct liquid from one to the other and including slide pipes each of which is extensible and includes universal joints to compensate for bodily movement of said first machine relative to the body of said vehicle.

9. In a vehicle having a body, a pair of journal boxes arranged beneath said body, an axle journaled in said boxes and provided with wheels for supporting said vehicle, and means for supporting said body from said journal boxes, the combination of a support pivotally connected at one side thereof to both of said journal boxes, other means for supporting said support at the other side thereof to provide with said journal boxes a three point suspension for said support, a rotary hydrodynamic machine carried by said support, and a drive connecting said rotary hydrodynamic machine to said axle to transmit rotary motion from one to the other.

10. In a vehicle having a body, a pair of journal boxes arranged beneath said body, an axle journaled in said boxes and provided with wheels for supporting said vehicle, and means for supporting said body from said journal boxes, the combination of a rotary hydrodynamic machine, a drive connecting said rotary machine to said axle to transmit rotary motion from one to the other, a support for said rotary machine, means for pivotally connecting said support at one side thereof to each of said journal boxes, and other means for supporting said support at the other side thereof from said body to provide with said journal boxes a three point suspension for said support.

11. In a vehicle having a body, a pair of journal boxes arranged beneath said body, an axle journaled in said boxes and provided with wheels for supporting said vehicle, and means for supporting said body from said journal boxes, the combination of a power unit, a flexible drive connecting said unit to said axle to transmit rotary motion from one to the other, a support for said power unit, means for connecting said support at one side thereof to each of said journal boxes, other means for supporting said support at the other side thereof to provide with said journal boxes a three point suspension for said support, a second power unit carried by said body, and power transmitting means connecting said units to each other and adapted to flex in response to movement of said axle relatively to said body, said connecting means including means for moving said support toward or from said axle to thereby adjust said drive.

12. In a vehicle having a body, a pair of journal boxes arranged beneath said body, an axle journaled in said boxes and provided with wheels for supporting said vehicle, and means for supporting said body from said journal boxes, the combination of a power unit, a flexible drive connecting said unit to said axle to transmit rotary motion from one to the other, a support for said power unit, a lug fixed to each of said journal boxes, two eccentrics each of which has one part thereof journaled in an end of said support and another part thereof journaled in one of said lugs to support said support at one side thereof, other means for supporting said support at the other side thereof to provide with said eccentrics a three point suspension for said support, and means for rotating each of said eccentrics to move said support relative to said axle to thereby adjust said drive.

13. In a vehicle having a body, a pair of journal boxes arranged beneath said body, an axle journaled in said boxes and provided with wheels for supporting said vehicle, and means for supporting said body from said journal boxes, the combination of a power unit, a flexible drive connecting said unit to said axle to transmit rotary motion from one to the other, a support for said power unit, a lug fixed to each of said journal boxes, two eccentrics each of which has one part thereof journaled in an end of said support and another part thereof journaled in one of said lugs to support said support at one side thereof, other means for supporting said support at the other side thereof to provide with said eccentrics a three point suspension for said support, a resilient bushing arranged around one portion of each of said eccentrics to reduce vibrations transmitted from said journal boxes to said support, and means for rotating each of said eccentrics to move said support relative to said axle to thereby adjust said drive.

14. In a vehicle having a body, a pair of journal boxes arranged beneath said body, an axle journaled in said boxes and provided with wheels for supporting said vehicle, and means for supporting said body from said journal boxes, the combination of a power unit, a flexible drive connecting said unit to said axle to transmit rotary motion from one to the other, a support for said power unit, a lug fixed to each of said journal boxes, two eccentrics each of which has one part thereof journaled in an end of said support and another part thereof journaled in one of said lugs to support said support at one side thereof, other means for supporting said support at the other side thereof to provide with said eccentrics a three point suspension for said support, a resilient bushing arranged around one portion of each of said eccentrics to reduce vibrations transmitted from said journal boxes to said support, and a lever for rotating each of said eccentrics to move said support relative to said axle to thereby adjust said drive, said lever having one end thereof connected to said eccentric near the axis thereof, means for securing said lever to the large portion of said eccentric at various points near the periphery thereof, and means for securing the other end portion of said lever to said support at various points upon the end thereof.

15. In a vehicle having an under-carriage, a pair of journal boxes arranged in said under-carriage, an axle journaled in said boxes and provided with wheels to support said vehicle and a body pivotally supported upon said under-carriage, the combination of a power unit, a drive connecting said unit to said axle to transmit rotary motion from one to the other, a support for said power unit, means for connecting said support at one side thereof to each of said journal boxes, and other means for supporting said support at the other side thereof from said body while permitting said under-carriage to rotate through a maximum angular distance relative to said body and said body to rock upon said under-carriage.

16. In a vehicle having an under-carriage, a pair of journal boxes arranged in said under-carriage, an axle journaled in said boxes and provided with wheels to support said vehicle and a body pivotally supported upon said under-carriage, the combination of a power unit, a drive connecting said unit to said axle to transmit rotary motion from one to the other, a support for said power unit, means for connecting said support at one side thereof to each of said journal boxes, other means for supporting said support at the other side thereof from said body while permitting said under-carriage to rotate through a maximum angular distance relative to said body and said body to rock upon said under-carriage, and safety means for supporting said support at said other side thereof from said under-carriage upon failure of said other supporting means.

17. In a vehicle having an under-carriage, a pair of journal boxes arranged in said under-carriage, an axle journaled in said boxes and provided with wheels to support said vehicle and a body pivotally supported upon said under-carriage, the combination of a power unit, a drive connecting said unit to said axle to transmit rotary motion from one to the other, a support for said power unit, means for connecting said support at one side thereof to each of said journal boxes, a curved track carried by said body upon the under side thereof, a trolley mounted upon said track, and a hanger for supporting said support at the other side thereof from said trolley.

18. In a vehicle having an under-carriage, a pair of journal boxes arranged in said under-carriage, an axle journaled in said boxes and provided with wheels to support said vehicle and a body pivotally supported upon said under-carriage, the combination of a power unit, a flexible drive connecting said unit to said axle to transmit rotary motion from one to the other, a support for said power unit, means for connecting said support at one side thereof to each of said journal boxes, said connecting means including means for moving said support toward or from said axle to thereby adjust said drive, and other means for supporting said support at the other side thereof from said body while permitting said under-carriage to rotate through a maximum angular distance relative to said body and said body to rock upon said under-carriage.

19. In a vehicle having an under-carriage, a pair of journal boxes arranged in said under-carriage, an axle journaled in said boxes and provided with wheels to support said vehicle and a body pivotally supported upon said under-carriage, the combination of a power unit, a drive connecting said unit to said axle to transmit rotary motion from one to the other, means for supporting said power unit at one side thereof from both of said journal boxes, and other means for supporting said power unit from said under-carriage including a link, pins for connecting opposite ends of said link to said unit and said under-carriage, and a resilient bushing arranged around at least one of said pins to permit slight movement of said under-carriage relative to said unit.

20. In a vehicle having a body, a pair of journal boxes arranged beneath said body, an axle journaled in said boxes and provided with wheels for supporting said vehicle, and means for supporting said body from said journal boxes, the combination of a rotary hydrodynamic machine supported at one side thereof from said journal boxes, a drive connecting said machine to said axle to transmit rotary motion from one to the other, a second hydrodynamic machine carried by said body, fluid channels connecting said machines to direct liquid from one to the other and including slide pipes each of which is extensible and includes universal joints to compensate for bodily movement of said first machine relative to the body of said vehicle, and hydraulic means connected between said body and said first machine to counterbalance in part the hydraulic forces tending to cause axial movement of one part of a slide pipe relative to another part thereof.

WALTER FERRIS.

(References on following page)

REFERENCES CITED

The following references are of record in the file of this patent:

UNITED STATES PATENTS

| Number | Name | Date |
|---|---|---|
| 523,453 | Biddle | July 24, 1894 |
| 558,953 | Hoffmann | Apr. 28, 1896 |
| 620,239 | Gibbs | Feb. 28, 1899 |
| 803,240 | Newbold | Oct. 31, 1905 |
| 854,442 | Van Kirk | May 21, 1907 |
| 1,655,740 | Robson | Jan. 10, 1928 |
| 1,779,751 | Peters | Oct. 28, 1930 |
| 2,063,471 | Stedefeld | Dec. 8, 1936 |
| 2,155,781 | Besler | Apr. 25, 1939 |
| 2,368,362 | Johnstone | Jan. 30, 1945 |